(12) United States Patent
Coon et al.

(10) Patent No.: US 6,414,820 B1
(45) Date of Patent: Jul. 2, 2002

(54) TRACE FLEXURE SUSPENSION WITH DIFFERENTIAL IMPEDANCE IN READ AND WRITE CONDUCTOR CIRCUITS

(75) Inventors: Warren Coon; Rafael Cuevas, both of Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 54 days.

(21) Appl. No.: 09/592,140

(22) Filed: Jun. 12, 2000

Related U.S. Application Data

(60) Provisional application No. 60/184,684, filed on Feb. 24, 2000.

(51) Int. Cl.$^7$ .................................................. G11B 5/48
(52) U.S. Cl. .................................................... 360/245.9
(58) Field of Search ............................ 360/245.9, 245.8

(56) References Cited

U.S. PATENT DOCUMENTS

| | | | | |
|---|---|---|---|---|
| 5,491,597 A | * | 2/1996 | Bennin et al. | 360/234.5 |
| 5,734,524 A | * | 3/1998 | Ruiz | 360/234 |
| 5,995,328 A | * | 11/1999 | Balakrishnan | 360/245.9 |
| 6,134,075 A | * | 10/2000 | Bennin et al. | 360/240 |

* cited by examiner

Primary Examiner—Brian E. Miller
(74) Attorney, Agent, or Firm—Louis J. Bachand

(57) ABSTRACT

A novel flexure provides an improved disk drive suspension, the flexure having a different thickness of insulative film between its metal layer and respective ones of its read and write conductor circuits to vary the circuit impedances accordingly to different and optimum values for each type of circuit.

47 Claims, 1 Drawing Sheet

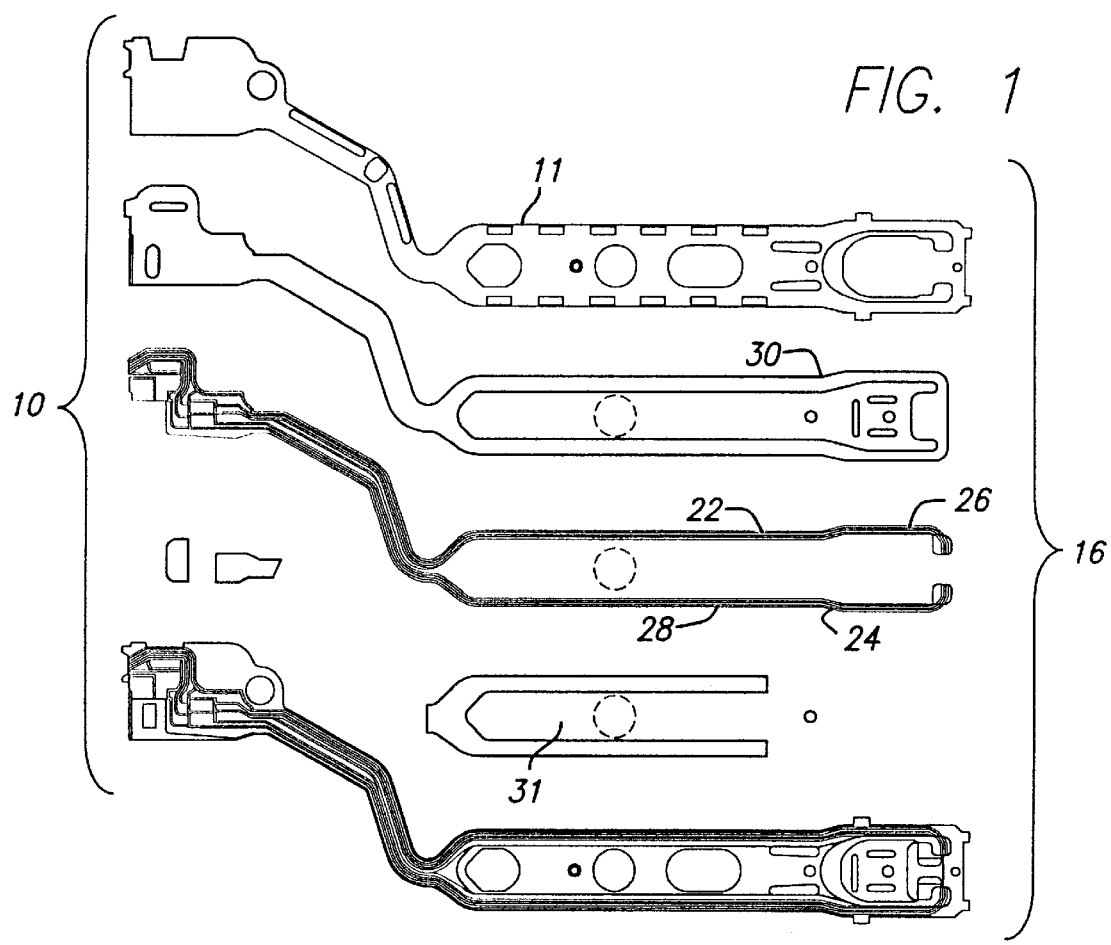
FIG. 1
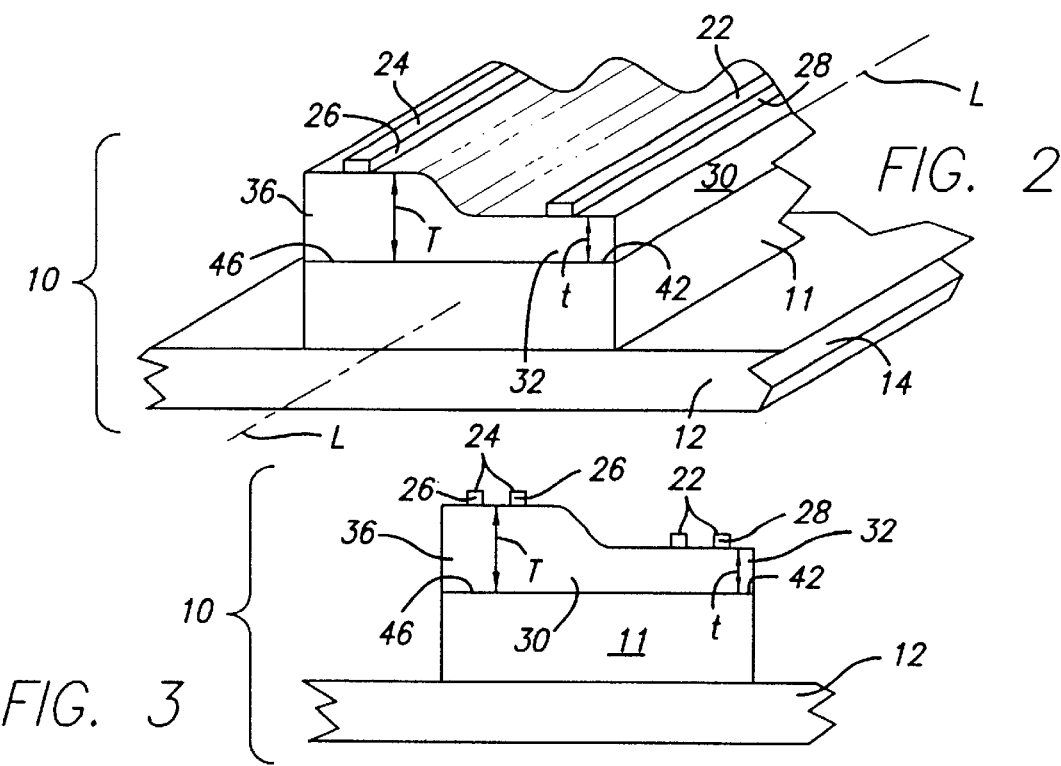
FIG. 2
FIG. 3

TRACE FLEXURE SUSPENSION WITH DIFFERENTIAL IMPEDANCE IN READ AND WRITE CONDUCTOR CIRCUITS

CROSS-REFERENCE TO RELATED APPLICATIONS

This application claims the benefit of United States Provisional Application Ser. No. 60/184,684, filed Feb. 24, 2000.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention relates to disk drive suspensions, and more particularly to a disk drive suspension having different impedance values for its read conductor circuit and its write conductor circuit.

2. Description of the Related Art

Typically a disk drive suspension comprises a steel load beam having a base section, a spring section and a rigid section. The suspension also typically includes a flexure supported on the load beam that may comprise a laminate of a support metal such as stainless steel with a plastic film that support a slider incorporating a read-write head, referred to herein as a slider. The flexure may extend substantially the full length of the load beam rigid section and support one or more sets of conductive traces that connect the read or write heads of the slider to the suspension electronics at the base section of the load beam. Construction of the flexure laminate is either additive in the sense that the several layers of metal, insulative film and trace conductors are built up on one another, or subtractive in the sense that a full laminate is reduced in one or more areas to fewer than all layers.

In either case the insulative film between the metal layer, or between the load beam if there is no laminate metal layer, and the conductive traces is the same thickness under the conductive read traces as under the conductive write traces. As set forth hereinafter there are disadvantages to the same thickness of film at the read circuit conductors as at the write circuit conductors, especially in blocking achievement of a different impedance for these circuits.

BRIEF SUMMARY OF THE INVENTION

It is an object of the invention, therefore, to provide greater control of impedance values in a disk drive suspension. It is a further object to provide a differential in impedance between read and write circuits in a disk drive suspension. It is a further object to provide a controlled thickness in the film insulative layer in the suspension flexure, differentiated between the read and write circuits, to vary the circuit capacitance and thus the impedance to optimize the impedance values for each circuit without compromise of the other circuit impedance. A further object is to provide a novel form of flexure for a disk drive suspension.

These and other objects of the invention to become apparent hereinafter are realized in a flexure for use with a load beam, the flexure comprising a metal layer (that will typically be adjacent to and fixed to a load beam), plural sets of trace conductors, and a plastic insulative film layer that serves to space the trace conductors from the metal layer in capacitance determining relation, the film layer having transversely to its longitudinal axis a differential thickness ranging from a lesser thickness in a first lateral portion adjacent one edge margin of the metal layer to a greater thickness in a second lateral portion adjacent the other edge margin of the metal layer, the plural sets of trace conductors including a first set of trace conductors defining a read circuit and attached to the film first portion at a spacing to be relatively closer to the metal layer across the film layer and a second set of trace conductors defining a write circuit and attached to the film layer second portion at a spacing to be relatively farther from the load beam across the film layer, whereby there is a capacitance differential between the read and write circuits, the capacitance differential providing the selected and different impedances for the circuits.

In a further embodiment, the invention provides a disk drive suspension having selected and different impedance values for its read trace conductor circuit and its write trace conductor circuit, the suspension comprising a steel load beam having a rigid section and extended along the length of the load beam rigid section a flexure for supporting a slider at the distal end of the load beam for operative association with a disk, the flexure comprising an assembly with the load beam of plural sets of trace conductors and plastic insulative film that spaces the trace conductors from the load beam in capacitance determining relation, the film having transversely of the load beam longitudinal axis a differential thickness ranging from a lesser thickness in a first lateral portion adjacent one edge margin of the load beam to a greater thickness in a second lateral portion adjacent the other edge margin of the load beam, the plural sets of trace conductors including a first set of trace conductors defining a read circuit and attached to the film first portion at a spacing to be relatively closer to the load beam across the film and a second set of trace conductors defining a write circuit and attached to the film second portion at a spacing to be relatively farther from the load beam across the film, whereby there is a capacitance differential between the read and write circuits, the capacitance differential providing the selected and different impedances for the circuits.

In these and like embodiments, typically, the selected impedance for the write circuit is greater than the selected impedance for the, read circuit, the selected write circuit impedance ranges from 80 to 110 ohms, and the read circuit impedance ranges from 60 to 80 ohms.

Moreover, typically, the film first lateral portion has a thickness of not less than 0.00030 inch, and the film second lateral portion has a thickness of not less than 0.00050 inch, the film first and second lateral portions differing in thickness by at least 0.00020 inch, the differential thickness in the film first and second lateral portions continues for substantially the full length of the load beam rigid section, the flexure further comprises a steel layer opposite the load beam and bonded to the plastic insulative film, the plastic insulative film comprises polyimide resin, and the stiffness of the load beam is reduced less than about 10% as a result of the difference in thickness between the film first and second lateral portions.

In its method aspects, the invention provides a method of providing a flexure for a disk drive suspension comprising a steel load beam, the flexure comprising a stainless steel layer, an insulative film layer and sets of read and write conductor circuit defining trace conductors spaced from the steel layer by the film with selected and different impedance values for its read trace conductor circuit and its write trace conductor circuit, the method including maintaining a thickness differential between first and second laterally adjacent portions of the insulative film in capacitance determining relation, whereby there is a capacitance differential between the read and write circuits, the capacitance differential providing the selected and different impedances for the circuits.

In particular embodiments, the method further includes forming the insulative layer at a first substantially uniform thickness across the laterally adjacent portions, and thereafter selectively reducing the film thickness in one or the other of the portions to realize the desired capacitance values, or, initially forming the insulative layer at different thicknesses in respective laterally adjacent portions as by building up a polyimide layer in one area while masking the adjacent area to realize the desired capacitance values, selecting as the impedance for the write circuit an impedance greater than the selected impedance for the read circuit, selecting a write circuit impedance in the range of 80 to 110 ohms, and for the read circuit an impedance in the range of 60 to 80 ohms, and selecting for the film first lateral portion a thickness of not less than 0.00030 inch, and for the film second lateral portion a thickness of not less than 0.00050 inch, having the film first and second lateral portions differ in thickness by at least 0.00020 inch, and attaching the flexure to a load beam.

BRIEF DESCRIPTION OF THE SEVERAL VIEWS OF THE DRAWINGS

The invention will be further described in conjunction with the attached drawings in which:

FIG. 1 is an exploded view of the invention flexure;

FIG. 2 is an isometric view of the flexure attached to a suspension load beam rigid section; and, FIG. 3 is a view in vertical section of the assembled flexure and suspension load beam rigid section.

DETAILED DESCRIPTION OF THE INVENTION

As noted briefly above, trace flexures or wireless flexures have been built with either a subtractive process or an additive process that provides a planar device in which the stainless steel (if used), the dielectric polyimide film layer, and the conductive copper layers are all essentially uniform thickness throughout their extents. The polyimide layer is the same thickness everywhere on a single part within manufacturing tolerances, and there has been no profiling in the film thickness by design. This is also true of the other layers.

The electrical properties of the wireless flexure are a function of the thickness of the layers, the dielectric and physical material properties of each material, and the geometry, or mechanical layout, of each layer.

In calculating the capacitance C of a wireless flexure, one takes into consideration the spacing between the conductive traces, the width of the traces, the thickness of the copper traces and the polyimide film, the conductivity of the stainless steel and the copper, and the dielectric properties of the polyimide. This provides the capacitance per unit length. All of these parameters are chosen and therefore known in a given device.

In designing a flexure for a suspension device, after the initial choice of thickness of each material is made, the thickness of each layer is normally held constant. For a subtractive process part, this is a matter of convenience and cost. The copper layer may be thickness-controlled by etching down the thickness starting at the original layer thickness. The dielectric film layer between the copper and the stainless steel cannot be easily accessed to etch under the copper. The stainless steel layer could be etched but this variation will not have much effect on the device electrical performance.

In the additive process, the layers can be built up to any desired thickness up to a certain point, which is approximately 10 microns for copper, and 25 microns for a dielectric film such as a polyimide film. The steel layer of the flexure is the starting point; it can be chosen initially and reduced from that starting value.

As frequencies approach 500 MHz and above, capacitance (C) and impedance (Z) become increasingly important to the wireless flexure design. The capacitance represents the amount of electrical signal that must be used to charge the device before each pulse is transmitted. Impedance represents the load that the electrical signal does work on. Capacitance affects the signal response as a function of time ("time domain") and impedance affects the signal response as a function of frequency ("frequency domain").

A trace circuit design can be thought of as two separate designs, one for the read circuit and one for the write circuit. The read circuit connects the read elements of the recording head to the actuator circuitry. The write circuit connects the write elements to the actuator circuitry. Present design trends typically design the write traces to be as close as possible to 110 ohms impedance, and the read traces to be as close as possible to 60 ohms impedance. In some cases, the target may be 100 ohms for read traces and 80 ohms for write traces.

Assuming no losses, the Z (impedance) equals SQR(UC), or SQuare Root of inductance divided by capacitance. Inductance is basically fixed by the length of the trace, and so cannot be easily controlled. Therefore, in this invention control of Z is through controlling C in a novel manner. The capacitance is separately specified for a given design with a maximum value, typically 2 pF or 3 pF per trace.

Controlling (increasing) C is commonly done by increasing the trace width beyond the normal (small) value of 0.0016 inches or by reducing the separation between traces below the usual value, also 0.0016 inches. Increasing the width increases the capacitance to ground directly in proportion to width. Decreasing the spacing to the adjacent trace increases the capacitance trace to trace.

Controlling (decreasing) C is usually done by increasing the trace-to-trace spacing or by removing the stainless layer under portions of the traces.

In the invention the suspension and method control the relationship between L and C to a specified value that is different for the read and write sides of the same part, and hold C to be less than a max value.

In a mechanically and electrically critical part such as a disk drive suspension flexure it is difficult to achieve the desired Z and C control simultaneously and also meet the mechanical requirements for stiffness and frequency response in the space allocated. Using prior art techniques, such as the removal of the stainless steel layer under the traces, makes the part be asymmetrical when the Z is adjusted by controlling the C. For example, the read side (60 Ohms) would require larger capacitance than the write side (110 ohms), so the traces would have to be wider than the other (write) side and the flexure would be asymmetrical mechanically, or the stainless would have to be removed from the write side, again leading to asymmetrical mechanics. The asymmetry of the mechanics is because the moduli of elasticity of stainless and copper are very high relative to polyimide.

It is difficult or impossible to meet all of the conflicting requirements simultaneously with prior art techniques with even the presently most advanced circuit designs having performance characteristics far different from the optimum. Thus, by using such design techniques, a wireless flexure and a suspension assembly thereof can be constructed that meets the specification for read and write impedance and stiffness but not at the same time capacitance or resistance.

This problem is solved in the present invention flexure by grading or tapering the dielectric polyimide film or layer thickness selectively to achieve the desired capacitance, e.g. as part of the original film material, or by etching or otherwise removing part of an original film layer. Most of the capacitance from trace to trace is controlled by the trace to stainless steel layer capacitance, and this capacitance is controlled by the thickness of the polyimide. The polyimide contributes only a negligible amount to the stiffness, so varying the thickness of the polyimide does not change the stiffness much and the change is controllable. Thus, for a doubling of the film thickness the pitch or roll stiffness is increased less than 10 per cent. If the polyimide film layer thickness is reduced to half, the pitch or roll stiffness is also reduced by less than 10 per cent. There is accordingly considerable freedom in changing the film thickness without undue effects on mechanical properties. The capacitance per unit length in an area can be doubled (or halved) with only a minor change in stiffness. This fact suggests a solution to the dilemma involved in trying to design for both stiffness and impedance and underlies the present invention.

In a typical design situation, the existing design of a conventional suspension flexure that had relied on a series of holes to control capacitance and thus impedance but had the correct impedance only on the write side, is modified to eliminate the holes and correct the impedance is for the read side without changing the already correct impedance on the write side. To do this, the polyimide thickness at the left and right lateral portions of the load beam rigid section is altered differentially. For example, assuming the film thickness was a uniform 0.00071-inch in the old design, providing a correct capacitance/impedance for the write side but too low a capacitance and too high an impedance for the read side, a new capacitance must be realized on the read side. To do so, calculate the new capacitance value as follows:

$Z = SQR\ (UC)$ $Z^2 = LC$ $C = L/Z^2$ $C_1/C_2 = Z_2^2/Z_1^2$ for $Z_1 = 100$ and $Z_2 = 80$ for the assumed case $C_1/C_2 = 10000/6400$ $C_1/C_2 = 1.56$ This means there is a need to make a 1.56 increase in capacitance of the read traces to reduce the read impedance to the desired value of 80 ohms. This can be achieved by reducing the thickness of the polyimide from 0.00071 inches to 0.00045.

The calculation of the desired thickness is simply $C = kA/d$

A is area of capacitor, d is spacing between plates, k is a constant $C_1/C_2 = d2/d1$ $d_2 = d_1 C_1/C_2$ $d_2 = 0.00071\ inches/1.56$ $d_2 = 0.00045\ inches$ The result means that to achieve the correct impedance for the read side there needs to be a reduction in the polyimide thickness to 0.00045 inches, a reduction that will have no significant effect on the stiffness, or stiffness symmetry.

With reference now to the drawings in detail, in FIGS. 1, 2 and 3, the invention suspension is at 10 to comprise in part flexure 16 having a steel underlayer 11 that will be attached (FIGS. 2 and 3) to a stainless steel load beam 12. Load beam 12 has a predetermined shape that is not critical here and that is dictated by desired mechanical properties and mass considerations. Load beam 12 has a rigid section 14. Flexure 16 in assembled condition with the load beam 12 extends along the length of at least the load beam rigid section 14 and supports a slider (not shown) at the distal end of the load beam for operative association with a disk (not shown).

The flexure 16 comprises an assembly of the stainless steel underlayer 11, copper trace conductors 28 defining read conductor circuit 22 and read copper trace conductors 26 defining read conductor circuit 24. Flexure 16 further comprises, disposed between the steel underlayer 11 and the trace conductors 26, 28 a plastic insulative film 30, typically polyimide film, that spaces the trace conductors from the load beam steel underlayer 11 (and thus from the load beam 12) a distance that determines the trace conductor capacitances. A second plastic film 31 covers the exposed trace conductors 26, 28 above the film 30. See FIGS. 2 and 3.

In order to provide the differential capacitance that is a feature of the invention, and that enables the controlled, varied impedance between the read and writes sides of the suspension, the dielectric film 30 has, in a direction lying transverse to the longitudinal axis L—L of the load beam a differential thickness. This thickness ranges from a lesser thickness t in a first lateral portion 32 of the film 30 adjacent one edge margin 42 of the stainless steel layer 11 to a greater thickness T in a second lateral portion 36 adjacent the other edge margin 46 of the stainless steel layer 11.

Read conductor circuit 22 comprises plural trace conductors 28 and defines a read circuit that is attached to the film 30 first lateral portion 32 at a spacing equal to thickness t to be relatively closer to the stainless steel layer 11, and load beam 12, across that film portion. Write conductor circuit 24 comprises plural trace conductors 26 and defines a write circuit that is attached to the film second lateral portion 36 at a spacing equal to thickness T to be relatively farther from the steel layer 11 and load beam 12, across that film portion.

As noted above, the differential spacing provides a capacitance differential respectively between the steel layer 11 and the read and write circuits 22 and 24. The capacitance differential provides the desired selected and different impedances for the circuits.

The invention thus provides greater control of impedance values in a flexure and in a disk drive suspension incorporating the flexure, a differential in impedance between read and write circuits, and a controlled thickness in the film insulative layer in the suspension flexure, differentiated between the read and write circuits, to vary the circuit capacitance and thus the impedance to optimize the impedance values for each circuit without compromise of the other circuit impedance. The foregoing objects are thus met.

We claim:

1. A flexure for use with a load beam in a disk drive suspension having selected and different impedance values for its read trace conductor circuit and its write trace conductor circuit, said flexure comprising a metal layer, plural sets of trace conductors, and a plastic insulative film layer spacing said trace conductors from said metal layer in capacitance determining relation, said film layer having transversely to its longitudinal axis a differential thickness ranging from a lesser thickness in a first lateral portion adjacent one edge margin of said metal layer to a greater thickness in a second lateral portion adjacent the other edge margin of said metal layer, said plural sets of trace conductors including a first set of trace conductors defining a read circuit and attached to said film first lateral portion at a spacing to be relatively closer to the metal layer across said film layer and a second set of trace conductors defining a write circuit and attached to said film layer second lateral portion at a spacing to be relatively farther from said metal layer across said film layer, whereby there is a capacitance differential between the read and write circuits, the capacitance differential providing the selected and different impedance values for the circuits.

2. The flexure according to claim 1, in which said selected impedance value for said write circuit is greater than the selected impedance value for said read circuit.

3. The flexure according to claim 2, in which said selected write circuit impedance value ranges from 80 to 110 ohms.

4. The flexure according to claim 2, in which said read circuit impedance value ranges from 60 to 80 ohms.

5. The flexure according to claim 1, in which said film first lateral portion has a thickness of not less than 0.00030 inch, and said film second lateral portion has a thickness of not less than 0.00050 inch, said film first and second lateral portions differing in thickness by at least 0.00020 inch.

6. A disk drive suspension having selected and different impedance values for its read trace conductor circuit and its write trace conductor circuit, said suspension comprising a metal load beam having a rigid section and extended along the length of said load beam rigid section a flexure for supporting a slider at the distal end of said load beam for operative association with a disk, said flexure comprising an assembly with said load beam of plural sets of trace conductors and plastic insulative film that spaces said trace conductors from said load beam in capacitance determining relation, said film having transversely of the load beam longitudinal axis a differential thickness ranging from a lesser thickness in a first lateral portion adjacent one edge margin of said load beam to a greater thickness in a second lateral portion adjacent the other edge margin of said load beam, said plural sets of trace conductors including a first set of trace conductors defining a read circuit and attached to said film first portion at a spacing to be relatively closer to said load beam across said film and a second set of trace conductors defining a write circuit and attached to said film second portion at a spacing to be relatively farther from said load beam across said film, whereby there is a capacitance differential between said read and write circuits, said capacitance differential providing said selected and different impedance values for said circuits.

7. The disk drive suspension according to claim 6, in which said selected impedance value for said write circuit is greater than the selected impedance for said read circuit.

8. The disk drive suspension according to claim 7, in which said selected write circuit impedance value ranges from 80 to 110 ohms.

9. The disk drive suspension according to claim 7, in which said read circuit impedance value ranges from 60 to 80 ohms.

10. The disk drive suspension according to claim 7, in which said film first lateral portion has a thickness of not less than 0.00030 inch, and said film second lateral portion has a thickness of not less than 0.00050 inch, said film first and second lateral portions differing in thickness by at least 0.00020 inch.

11. The disk drive suspension according to claim 7, in which said differential thickness in said film first and second lateral portions continues for substantially the full length of said load beam rigid section.

12. The disk drive suspension according to claim 7, in which said flexure further comprises a steel layer opposite said load beam and bonded to said plastic insulative film.

13. The disk drive suspension according to claim 7, in which said plastic insulative film comprises polyimide resin.

14. The disk drive suspension according to claim 7, in which the stiffness of the load beam is reduced less than about 10% as a result of the difference in thickness between the film first and second lateral portions.

15. The disk drive suspension according to claim 8, in which said film first lateral portion has a thickness of not less than 0.00030 inch, and said film second lateral portion has a thickness of not less than 0.00050 inch, said film first and second lateral portions differing in thickness by at least 0.00020 inch.

16. The disk drive suspension according to claim 15, in which said differential thickness in said film first and second lateral portions continues for substantially the full length of said load beam rigid section.

17. The disk drive suspension according to claim 16 in which said flexure further comprises a steel layer opposite said load beam and bonded to said plastic insulative film.

18. The disk drive suspension according to claim 17, in which said plastic insulative film comprises polyimide resin.

19. The disk drive suspension according to claim 18, in which said selected write circuit impedance value ranges from 80 to 110 ohms.

20. The disk drive suspension according to claim 19, in which said read circuit impedance value ranges from 60 to 80 ohms.

21. The disk drive suspension according to claim 20, in which the stiffness of the load beam is reduced less than about 10% as a result of the difference in thickness between the film first and second lateral portions.

22. A method of providing a flexure for a disk drive suspension, said flexure comprising a metal layer, an insulative film layer and first and second sets of read and write conductor circuit defining trace conductors respectively, said trace conductors being spaced from said metal layer by said film with selected and different impedance values for said read trace conductor circuit and said write trace conductor circuit, said method including maintaining a first thickness in a first portion of insulative film layer between said metal layer and one of said read or write circuits, and maintaining a second thickness in a second portion of said insulative film layer between said metal layer and the other of said read and write circuits to provide a thickness differential between said insulative film first and second portions, whereby there is a capacitance differential between said read and write circuits, said capacitance differential providing said selected and different impedance values for said circuits.

23. The method according to claim 22, including also forming said insulative film layer at a first substantially uniform thickness, and thereafter selectively reducing said film thickness in one or the other of said first and second insulative film portions to realize the desired capacitance values.

24. The method according to claim 22, including also forming said insulative film layer at different thicknesses in its said first and second insulative film portions to realize said desired capacitance differential and impedance values.

25. The method according to claim 22, including also mounting said flexure to a steel load beam.

26. A flexure for a disk drive suspension having selected and different impedance values for its read trace conductor circuit and its write trace conductor circuit, said flexure comprising a metal layer, plural sets of trace conductors, and a plastic insulative film layer spacing said trace conductors from said metal layer in capacitance determining relation, said film layer having transversely to its longitudinal axis a differential thickness ranging from a lesser thickness In a first lateral portion to a greater thickness in a second lateral portion, said plural sets of trace conductors including a first set of trace conductors attached to said film layer first portion at a spacing to be relatively closer to the metal layer across said film layer and a second set of trace conductors and attached to said film layer second portion at a spacing to be relatively farther from said metal layer across said film layer, whereby there is a capacitance differential between said first and second sets of trace conductors, the capacitance differential providing the selected and different Impedance values for the circuits.

27. The flexure according to claim 26, in which said first set of trace conductors define said read circuit, said second set of trace conductors define said write circuit, said second set of trace conductors having a selected impedance value greater than the selected impedance value for said first set of trace conductors.

28. The flexure according to claim 27, in which said selected write circuit impedance value ranges from 80 to 110 ohms.

29. The flexure according to claim 27, in which said read circuit impedance value ranges from 60 to 80 ohms.

30. The flexure according to claim 26, in which said film first lateral portion has a thickness of not less than 0.00030 inch, and said film second lateral portion has a thickness of not less than 0.00050 inch, said film first and second lateral portions differing in thickness by at least 0.00020 inch.

31. A disk drive suspension having selected and different impedance values for its read trace conductor circuit and its write trace conductor circuit, said suspension comprising a metal load beam having a rigid section and a flexure for supporting a slider at the distal end of said load beam for operative association with a disk, said flexure comprising plural sets of trace conductors and plastic insulative film that spaces said trace conductors from said load beam in capacitance determining relation, said film having transversely of the load beam longitudinal axis a differential thickness ranging from a lesser thickness in a first portion to a greater thickness in a second portion, said plural sets of trace conductors including a first set of trace conductors defining a read circuit and attached to said insulative film first portion at a spacing to be relatively closer to said load beam across said insulative film first portion and a second set of trace conductors defining a write circuit and attached to said insulative film second portion at a spacing to be relatively farther from said load beam across said insulative film second portion, whereby there is a capacitance differential between said read and write circuits, said capacitance differential providing said selected and different impedance values for said read trace and said write trace conductor circuits.

32. The disk drive suspension according to claim 31, in which said selected impedance value for said write circuit is greater than the selected impedance for said read circuit.

33. The disk drive according to claim 32, in which said selected write circuit impedance value ranges from 80 to 110 ohms and said read circuit impedance value ranges from 60 to 80 ohms.

34. The disk drive according to claim 32, in which said insulative film first portion has a thickness of not less than 0.00030 inch, and said insulative film second portion has a thickness of not less than 0.00050 inch, said insulative film first and second portions differing in thickness by at least 0.00020 inch.

35. The disk drive suspension according to claim 32, in which said differential thickness in said insulative film first and second portions continues for substantially the full length of said load beam rigid section.

36. The disk drive suspension according to claim 32, in which said flexure further comprises a steel layer opposite said load beam and bonded to said plastic insulative film.

37. The disk drive suspension according to claim 32, in which said plastic insulative film comprises polyimide resin.

38. The disk drive suspension according to claim 32, in which the stiffness of the load beam is reduced less than about 10% as a result of the difference in thickness between the film first and second portions.

39. The disk drive according to claim 33, in which said film first portion has a thickness of not less than 0.00030 inch, and said film second portion has a thickness of not less than 0.00050 inch, said film first and second portions differing in thickness by at least 0.00020 inch.

40. The disk drive suspension according to claim 39, in which said differential thickness in said film first and second portions continues for substantially the full length of said load beam rigid section.

41. The disk drive suspension according to claim 40 in which said flexure further comprises a steel layer opposite said load beam and bonded to said plastic insulative film.

42. The disk drive suspension according to claim 41, in which said plastic insulative film comprises polyimide resin.

43. The disk drive suspension according to claim 42, in which the stiffness of the load beam is reduced less than about 10% as a result of the difference in thickness between the film first and second portions.

44. A method of providing a flexure for a disk drive suspension comprising a metal load beam and a flexure, said flexure comprising an insulative film layer and sets of read and write conductor circuit defining trace conductors spaced from said load beam by said film with selected and different impedance values for said read trace conductor circuit and said write trace conductor circuit, said method including maintaining a first thickness of insulating film layer between said load beam and one of said read or write circuits, and laterally adjacent said first thickness insulating film layer maintaining a second thickness of said insulating film layer between said load beam and the other of said read and write circuits to provide a thickness differential between said laterally adjacent portions of said insulative film layer, whereby there is a capacitance differential between said read and write circuits, said capacitance differential providing said selected and different impedance values for said circuits.

45. The method according to claim 44, including also forming said insulative film layer at a first substantially uniform thickness across said laterally adjacent portions, and thereafter selectively reducing said film thickness in one or the other of said portions to realize the desired capacitance differential and impedance values.

46. The method according to claim 44, including also forming said insulative firm layer at different thicknesses in respective laterally adjacent portions to realize said desired capacitance differential and impedance values.

47. The method according to claim 44, including also maintaining a metal layer adjacent said load beam, said metal layer being attached to said insulative film layer.

* * * * *

UNITED STATES PATENT AND TRADEMARK OFFICE
CERTIFICATE OF CORRECTION

PATENT NO. : 6,414,820 B1 Page 1 of 1
DATED : July 2, 2002
INVENTOR(S) : Warren Coon and Rafael Cuevas It is certified that error appears in the above-identified patent and that said Letters Patent is hereby corrected as shown below:

<u>Column 4,</u>
Line 30, "SQR(UC)" should read -- SQR(L/C) --.

<u>Column 5,</u>
Line 42, "Z=SQR(UC)" should read -- Z=SQR(L/C) --.
Line 43, "Z^2=LC" should read -- Z^2=L/C --.

Signed and Sealed this

Eleventh Day of April, 2006

JON W. DUDAS
*Director of the United States Patent and Trademark Office*